United States Patent
Sébire et al.

(10) Patent No.: US 11,716,747 B2
(45) Date of Patent: Aug. 1, 2023

(54) POLLING AND KEEP-ALIVE SIGNALS FOR MULTIMEDIA BROADCAST MULTICAST SERVICE

(71) Applicant: NOKIA TECHNOLOGIES OY, Espoo (FI)

(72) Inventors: Benoist Pierre Sébire, Tokyo (JP); David Bhatoolaul, Wiltshire (GB); Volker Pauli, Ansbach (DE); Esa Mikael Malkamäki, Espoo (FI); Athul Prasad, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 20 days.

(21) Appl. No.: 17/221,648

(22) Filed: Apr. 2, 2021

(65) Prior Publication Data
US 2022/0322355 A1 Oct. 6, 2022

(51) Int. Cl.
| | |
|---|---|
| *H04W 72/50* | (2023.01) |
| *H04W 72/53* | (2023.01) |
| *H04W 76/11* | (2018.01) |
| *H04L 1/00* | (2006.01) |
| *H04W 52/36* | (2009.01) |
| *H04W 72/044* | (2023.01) |
| *H04W 72/23* | (2023.01) |

(52) U.S. Cl.
CPC ........... *H04W 72/53* (2023.01); *H04L 1/0038* (2013.01); *H04L 1/0061* (2013.01); *H04W 52/36* (2013.01); *H04W 72/0466* (2013.01); *H04W 72/23* (2023.01); *H04W 76/11* (2018.02)

(58) Field of Classification Search
CPC ............. H04W 72/0493; H04W 52/36; H04W 72/042; H04W 72/0466; H04W 76/11; H04L 1/0038; H04L 1/0061
See application file for complete search history.

(56) References Cited

U.S. PATENT DOCUMENTS

| | | | |
|---|---|---|---|
| 2004/0157640 A1* | 8/2004 | Pirskanen | H04W 4/06 455/552.1 |
| 2007/0281726 A1* | 12/2007 | Rey | H04L 12/1868 455/522 |
| 2009/0245155 A1* | 10/2009 | Fukunaga | H04W 72/005 370/312 |

(Continued)

FOREIGN PATENT DOCUMENTS

WO 2013/079114 A1 6/2013

OTHER PUBLICATIONS

Huawei, 3GPP TSG RAN Meeting #86, Sitges, Spain, Dec. 9-12, 2019, RP-193248, "New Work Item on NR support of Multicast and Broadcast Services", 6 pages.

(Continued)

*Primary Examiner* — Afshawn M Towfighi
(74) *Attorney, Agent, or Firm* — Squire Patton Boggs (US) LLP

(57) ABSTRACT

Systems, methods, apparatuses, and computer program products for polling and keep-alive signals for multimedia broadcast multicast service. The method may include receiving a physical downlink control channel order addressed to a group-radio network temporary identifier. The method may also include performing uplink transmission of a signal in response to the physical downlink control channel order.

16 Claims, 5 Drawing Sheets

(56) References Cited

U.S. PATENT DOCUMENTS

| | | | |
|---|---|---|---|
| 2009/0259910 A1* | 10/2009 | Lee | H04W 74/0833 |
| | | | 714/748 |
| 2013/0242730 A1 | 9/2013 | Pelletier et al. | |
| 2015/0092554 A1 | 4/2015 | Mochizuki et al. | |
| 2015/0282234 A1* | 10/2015 | Sartori | H04W 72/042 |
| | | | 370/329 |
| 2017/0347276 A1 | 11/2017 | Yu et al. | |
| 2018/0167901 A1* | 6/2018 | Wang | H04W 74/006 |
| 2019/0098655 A1* | 3/2019 | Shih | H04L 5/0048 |
| 2019/0268920 A1* | 8/2019 | Falahati | H04W 76/27 |
| 2021/0037562 A1* | 2/2021 | Takeda | H04L 5/0053 |
| 2021/0058947 A1* | 2/2021 | Lin | H04W 74/0833 |
| 2021/0105633 A1* | 4/2021 | Vaidya | H04W 76/27 |
| 2021/0243789 A1* | 8/2021 | Fan | H04L 5/0094 |
| 2022/0124780 A1* | 4/2022 | Lei | H04L 1/1671 |
| 2022/0132522 A1* | 4/2022 | Wei | H04W 72/121 |

OTHER PUBLICATIONS

European Search Report issued in corresponding European Patent Application No. 22160520.7-1215 dated Jul. 11, 2022.
ZTE, "Discussion on mechanisms to Support Group Scheduling for RRC_Connected UEs", 3GPP TSG RAN WG1 #104-e, e-meeting, Jan. 25-Feb. 5, 2021, R1-2100106, 13 pages.

\* cited by examiner

POLLING AND KEEP-ALIVE SIGNALS FOR MULTIMEDIA BROADCAST MULTICAST SERVICE

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for polling and keep-alive signals for multimedia broadcast multicast service.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on NR technology, but the 5G (or NG) network can also build on E-UTRAN radio. It is estimated that NR will provide bitrates on the order of 10-20 Gbit/s or higher and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include receiving a physical downlink control channel order addressed to a group-radio network temporary identifier. The method may also include performing uplink transmission of a signal in response to the physical downlink control channel order.

Other example embodiments may be directed to an apparatus. The apparatus may include at least one processor and at least one memory including computer program code. The at least one memory and computer program code may be configured to, with the at least one processor, cause the apparatus at least to receive a physical downlink control channel order addressed to a group-radio network temporary identifier. The apparatus may also be configured to perform uplink transmission of a signal in response to the physical downlink control channel order.

Other example embodiments may be directed to an apparatus. The apparatus may include means for receiving a physical downlink control channel order addressed to a group-radio network temporary identifier. The apparatus may also include means for performing perform uplink transmission of a signal in response to the physical downlink control channel order.

In accordance with other example embodiments, a non-transitory computer readable medium may be encoded with instructions that may, when executed in hardware, perform a method. The method may include receiving a physical downlink control channel order addressed to a group-radio network temporary identifier. The method may also include performing uplink transmission of a signal in response to the physical downlink control channel order.

Other example embodiments may be directed to a computer program product that performs a method. The method may include receiving a physical downlink control channel order addressed to a group-radio network temporary identifier. The method may also include performing uplink transmission of a signal in response to the physical downlink control channel order.

Other example embodiments may be directed to an apparatus that may include circuitry configured to receive a physical downlink control channel order addressed to a group-radio network temporary identifier. The apparatus may also include circuitry configured to perform uplink transmission of a signal in response to the physical downlink control channel order.

Certain example embodiments may be directed to a method. The method may include configuring a user equipment with a configuration linked to a group-radio network temporary identifier. The method may also include sending a physical downlink control channel order to the user equipment addressed to the group-radio network temporary identifier. The method may further include receiving an uplink transmission of a signal from the user equipment according to the physical downlink control channel order.

Other example embodiments may be directed to an apparatus. The apparatus may include at least one processor and at least one memory including computer program code. The at least one memory and computer program code may be configured to, with the at least one processor, cause the apparatus at least to configure a user equipment with a configuration linked to a group-radio network temporary identifier. The apparatus may also be configured to send a physical downlink control channel order to the user equipment addressed to the group-radio network temporary identifier. The apparatus may further be configured to receive an uplink transmission of a signal from the user equipment according to the physical downlink control channel order.

Other example embodiments may be directed to an apparatus. The apparatus may include means for configuring a user equipment with a configuration linked to a group-radio network temporary identifier. The apparatus may also include means for sending a physical downlink control channel order to the user equipment addressed to the group-radio network temporary identifier. The apparatus may further include means for receiving receive an uplink transmission of a signal from the user equipment according to the physical downlink control channel order.

In accordance with other example embodiments, a non-transitory computer readable medium may be encoded with instructions that may, when executed in hardware, perform a method. The method may include configuring a user equipment with a configuration linked to a group-radio network temporary identifier. The method may also include sending a physical downlink control channel order to the user equipment addressed to the group-radio network temporary identifier. The method may further include receiving an uplink transmission of a signal from the user equipment according to the physical downlink control channel order.

Other example embodiments may be directed to a computer program product that performs a method. The method may include configuring a user equipment with a configuration linked to a group-radio network temporary identifier. The method may also include sending a physical downlink control channel order to the user equipment addressed to the group-radio network temporary identifier. The method may further include receiving an uplink transmission of a signal from the user equipment according to the physical downlink control channel order.

Other example embodiments may be directed to an apparatus that may include circuitry configured to configure a user equipment with a configuration linked to a group-radio network temporary identifier. The apparatus may also include circuitry configured to send a physical downlink control channel order to the user equipment addressed to the group-radio network temporary identifier. The apparatus may further include circuitry configured to receive an uplink transmission of a signal from the user equipment according to the physical downlink control channel order.

Certain example embodiments may be directed to a method. The method may include receiving a configuration from a network element that is linked to a group-radio network temporary identifier. The method may also include periodically transmitting signals in uplink according to the configuration.

Other example embodiments may be directed to an apparatus. The apparatus may include at least one processor and at least one memory including computer program code. The at least one memory and computer program code may be configured to, with the at least one processor, cause the apparatus at least to receive a configuration from a network element that is linked to a group-radio network temporary identifier. The apparatus may also be configured to periodically transmit signals in uplink according to the configuration.

Other example embodiments may be directed to an apparatus. The apparatus may include means for receiving a configuration from a network element that is linked to a group-radio network temporary identifier. The apparatus may also include means for periodically transmitting signals in uplink according to the configuration.

In accordance with other example embodiments, a non-transitory computer readable medium may be encoded with instructions that may, when executed in hardware, perform a method. The method may include receiving a configuration from a network element that is linked to a group-radio network temporary identifier. The method may also include periodically transmitting signals in uplink according to the configuration.

Other example embodiments may be directed to a computer program product that performs a method. The method may include receiving a configuration from a network element that is linked to a group-radio network temporary identifier. The method may also include periodically transmitting signals in uplink according to the configuration.

Other example embodiments may be directed to an apparatus that may include circuitry configured to receive a configuration from a network element that is linked to a group-radio network temporary identifier. The apparatus may also include circuitry configured to periodically transmit signals in uplink according to the configuration.

Certain example embodiments may be directed to a method. The method may include configuring a user equipment with a configuration linked to a group-radio network temporary identifier. The method may also include periodically receive signals in uplink according to the configuration.

Other example embodiments may be directed to an apparatus. The apparatus may include at least one processor and at least one memory including computer program code. The at least one memory and computer program code may be configured to, with the at least one processor, cause the apparatus at least to configure a user equipment with a configuration linked to a group-radio network temporary identifier. The apparatus may also be configured to periodically receive signals in uplink according to the configuration.

Other example embodiments may be directed to an apparatus. The apparatus may include means for configuring a user equipment with a configuration linked to a group-radio network temporary identifier. The apparatus may also include means for periodically receive signals in uplink according to the configuration.

In accordance with other example embodiments, a non-transitory computer readable medium may be encoded with instructions that may, when executed in hardware, perform a method. The method may include configuring a user equipment with a configuration linked to a group-radio network temporary identifier. The method may also include periodically receive signals in uplink according to the configuration.

Other example embodiments may be directed to a computer program product that performs a method. The method may include configuring a user equipment with a configuration linked to a group-radio network temporary identifier. The method may also include periodically receive signals in uplink according to the configuration.

Other example embodiments may be directed to an apparatus that may include circuitry configured to configure a user equipment with a configuration linked to a group-radio network temporary identifier. The apparatus may also include circuitry configured to periodically receive signals in uplink according to the configuration.

BRIEF DESCRIPTION OF THE DRAWINGS

For proper understanding of example embodiments, reference should be made to the accompanying drawings, wherein.

DETAILED DESCRIPTION

Figure 1:
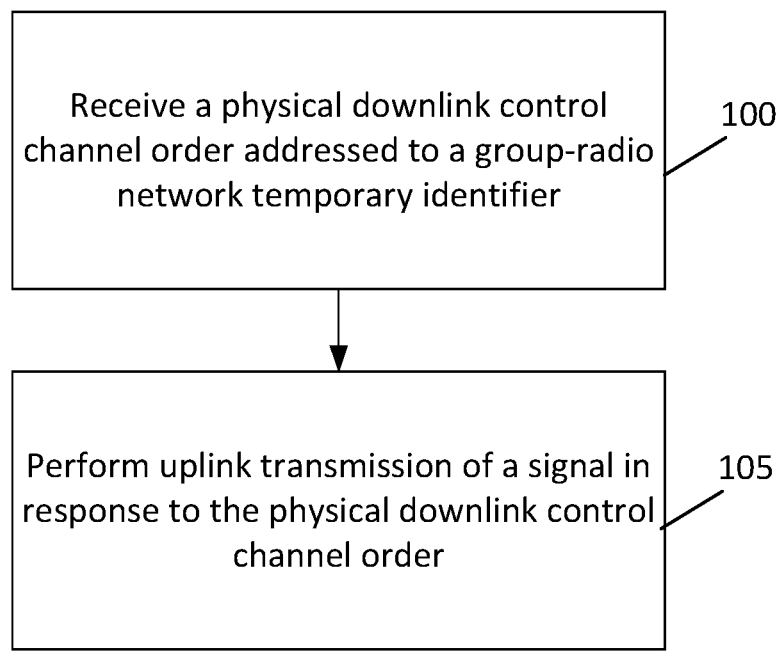
FIG. 1 illustrates an example flow diagram of a method, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for polling and keep-alive signals for multimedia broadcast multicast service.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

$3^{rd}$ Generation Partnership Project (3GPP) provides support of multimedia broadcast multicast service (MBMS) for new radio (NR). For instance, multicast reception in RRC-CONNECTED state has been agreed upon in RAN2, and broadcast reception in IDLE, CONNECTED, and INACTIVE states have been agreed upon. Additionally, multicast broadcast services (MBS) may be carried in protocol data units (PDUs) conveyed in transport blocks addressed by a group radio network temporary identifier (G-RNTI). Multiple services may be carried in the same transport block and addressed by the same G-RNTI, or different G-RNTI may be used for different MBS services.

Not knowing whether INACTIVE and IDLE user equipment (UEs) are receiving an MBS service, the network may not know if it should use downlink (DL) resources to transmit an MBS service. In IDLE state, the location of a UE within a tracking area is typically not known. In INACTIVE state, although the network may know how many inactive UEs are within a radio access network (RAN) based notification area (RNA) (since pushing a UE to RRC_INACTIVE is a network decision), the precise location of UEs within an RNA may be unknown. In other words, in a given cell, the network may not know if and how many INACTIVE UEs are receiving a multicast service, if and how many INACTIVE UEs are receiving a broadcast service, and if and how many IDLE UEs are receiving a broadcast service.

A method relying on a group wake-up or trigger signal as a counting procedure of how many UEs are receiving an MBS service has been discussed. An alternative suggests having multiple UEs transmit the same preamble and estimating the number of UEs from the received signal strength. However, this does not provide a way to know what kind of DL signal should be used. Thus, certain example embodiments provide solution(s) to assess whether some INACTIVE/IDLE UEs are receiving an MBS service in a cell.

According to certain example embodiments, it may be possible to assess whether some INACTIVE/IDLE UEs are receiving an MBS service in a cell through energy detection on a given preamble. For instance, some example embodiments may implement a polling procedure by using a physical downlink control channel (PDCCH) order addressed to a group-common RNTI or G-RNTI. This implies that the control channel information sent to the users receiving multicast or broadcast service may be scrambled using a group-common RNTI associated with a particular service, which may be signaled to the UE. Specifically, in certain example embodiments, the UEs receiving an MBS service as addressed by the G-RNTI may also receive the PDCCH order and initiate an uplink (UL) transmission of a preamble according to that PDCCH order. Unlike a regular PDCCH order, this may not initiate a full random-access procedure; just the transmission of one UL preamble. According to certain example embodiments, by sending PDCCH order using the G-RNTI of the MBS service, the network may be able to check whether any UE is receiving the service in the cell. If no UE responds, then the network may know that no UE is receiving this service, and can stop transmitting it.

If the UE is receiving multicast traffic, it may be assumed that the network would be aware of the fact that the UE is receiving multicast data. If the UE is receiving broadcast traffic, the network might not be aware that the UE is receiving the broadcast data. It may further be assumed that the multicast traffic is received by users in RRC_CONNECTED and/or RRC_INACTIVE state, whereas broadcast traffic could be received by UEs in any RRC state.

According to certain example embodiments, regular preamble power ramping by the UE (as described in 3GPP TS 38.321) may also be used where the network responds with a random-access response message to terminate the power ramping process. When power ramping is applied, the UE may first transmit the random-access preamble with low power. If no random-access response is received from the network, the UE may retransmit the preamble with a higher power. The UE may repeat the transmission of the preamble (every time with a higher power) until it receives the related random-access response from the network or reaches the maximum number of preamble transmissions. In certain example embodiments, the random-access response may include a medium access control (MAC) sub-header with a random-access preamble ID (RAPID) (i.e., similar to acknowledgment for system information (SI) request). Thus, no Msg3 is transmitted by the UE. Whether one preamble or multiple preambles with power ramping is used may be configured by the network.

In certain example embodiments, the UE may be configured by the higher layers—such as a radio resource control (RRC) layer (as described in 3GPP TS 38.331) which uses RRC setup or reconfiguration messages to configure UE regarding the use of G-RNTI based PDCCH order, which may enable the UE to perform blind decoding using an appropriate downlink control information (DCI) format. In other example embodiments, the UL transmission of the preamble may be triggered by using a modified group-common PDCCH or DCI, which may be used for scheduling the MBS service.

According to other example embodiments, another way to assess whether some INACTIVE/IDLE UEs are receiving an MBS service in a cell through energy detection on a given preamble may be via a procedure used to determine whether the service should still be provided (i.e., a keep-alive procedure). For instance, in certain example embodiments, the procedure may include configuring periodic transmission of preambles. Specifically, the UEs receiving an MBS service may periodically send preambles in UL according to the configuration. According to certain example embodiments, the configuration (e.g., preamble, physical random-access channel (PRACH) resource, and periodicity) may be linked to a particular G-RNTI, or to a particular service. To avoid possible collisions with preamble transmissions from regular random-access procedures from other UEs, certain example embodiments may employ resource segregation. According to some example embodiments, a preamble may be an example of a shared/common UL resource. As described herein, shared/common UL resource may be used.

Another example that may be used by UEs with proper time alignment is the physical uplink control channel (PUCCH). According to certain example embodiments, the shared/common UL resource used for polling and for periodic transmissions may be different or the same.

In certain example embodiments, different shared/common UL resources may be used to optimize UL power (i.e., limit the risk of excessive inter-cell interference in singular UL resources) and/or retransmissions. For instance, when power ramping is not used for polling, if a large number of UEs respond at the same time, this may generate a power spike at the gNB. Thus, certain example embodiments may provide solutions to this problem by way of the gNB off-loading some UEs to use different shared/common UL resources. In other example embodiments, the gNB may use PDCCH signaling (e.g., a bit within the existing MBS physical downlink control channel (PDCCH) DCI) to request UEs to ramp down/up the power they use to transmit to the common UL resource.

According to certain example embodiments, periodicity of the resources provisioned for periodic transmission of signals may be shorter than the interval at which individual UEs are requested to send the periodic transmission signal. This way, the network may provide new UEs with frequent opportunities to declare their interest for the sake of service, while periodic transmission activity of incumbent UEs is limited.

In certain example embodiments, the two mechanisms of polling and periodic transmissions may allow the network to decide to either maintain or disable a broadcast/multicast service. UEs interested in maintaining the broadcast/multicast service may transmit preambles at regular periods (configured by the network), to effectively "keep alive" the service. Alternatively, or as a complementary measure, in other example embodiments, the network may regularly poll interested UEs. Energy detection on the shared/common UL resource may give the network a rough idea of how many UEs (if any) are receiving the corresponding service(s). In certain example embodiments, the absence of "keep alive" energy in the shared/common UL resource for a configurable period of time or a configurable number of interest indication occasions may be used as a trigger to disable the MBS service.

According to certain example embodiments, a two-stage approach may be used. For instance, while the period of the periodic transmission signal (i.e., first stage) may be large (e.g., in the order of seconds), the network may, in case absence of the regular periodic transmission signal is detected, dynamically request/poll (a sequence of) additional periodic transmission signal transmission(s) at short intervals (i.e., second stage), possibly with power ramping, to confirm that there is no more UE interested in the broadcast service. If the periodicity of the resources provisioned for periodic transmission signals are shorter than the interval at which individual UEs are requested to send the periodic transmission signal as described above, these additional transmissions with shorter periodicity may be in the grid of the resources provided for periodic transmissions. A difference here may be that the UEs may now be requested to use each of these transmission opportunities.

In certain example embodiments, the use of PDCCH order for the purposes of UL preamble message triggering (i.e., second stage when used in combination with periodic signals) may need the UE to be configured with a new flag within the higher layer, or radio resource control (RRC) configurations related to G-RNTI and other MBS service-related parameters. According to certain example embodiments, this enables the UE to monitor or blind decode for the appropriate DCI format containing the PDCCH order in the appropriate MBS service control resource set (CORESET). Additionally, the RRC configurations may be made as part of common or UE-specific search space configurations. For instance, in certain example embodiments, the information configuring the UE to monitor for the G-RNTI scrambled PDCCH order may be contained in multiple place including but not limited to, for example: 1) configurations related to G-RNTI and other MBS service-related parameters; 2) common search space configuration; and 3) UE-specific search space configuration.

According to certain example embodiments, the triggering of the UL preamble transmission may optionally be done using in-band signaling using the group-common PDCCH (PDCCH with cyclic redundancy check (CRC) scrambled by G-RNTI) DCI. If this option is used, the PDCCH DCI message containing the MBS service DL scheduling information may also be used to trigger the UL preamble transmission. For example, since IDLE/INACTIVE UEs may not transmit hybrid automatic repeat request (HARQ) feedback, HARQ process number field or new data indicator within the DCI may be used for this purpose. In this example, these parameters may be considered as mandatory, which enables the UE to estimate the DCI size accurately while blind decoding.

Figure 5A:
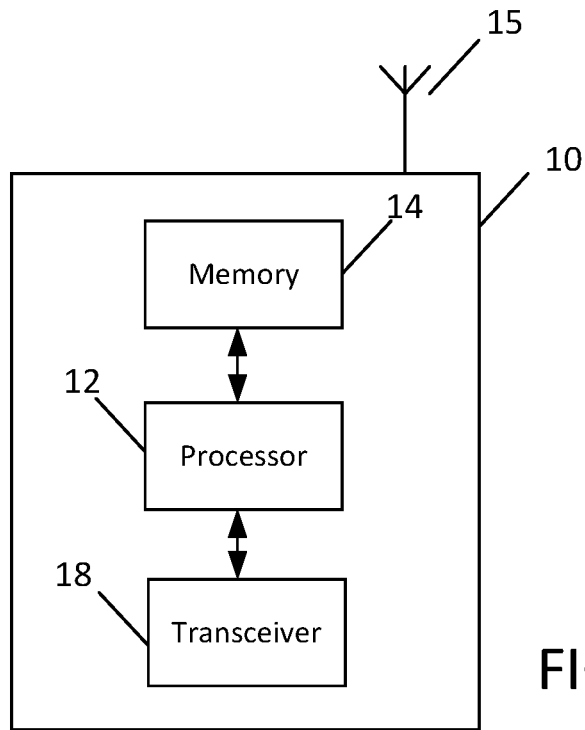
FIG. 5(a) illustrates an apparatus, according to certain example embodiments.

FIG. 1 illustrates an example flow diagram of a method, according to certain example embodiments. In an example embodiment, the method of FIG. 1 may be performed by a network entity, network node, or a group of multiple network elements in a 3GPP system, such as LTE or 5G-NR. For instance, in an example embodiment, the method of FIG. 1 may be performed by a UE, for instance similar to apparatus 10 illustrated in FIG. 5(a).

According to certain example embodiments, the method of FIG. 1 may include, at 100, receiving a physical downlink control channel order addressed to a group-radio network temporary identifier. At 105, the method may include performing uplink transmission of a signal in response to the physical downlink control channel order.

According to certain example embodiments, the physical downlink control channel order may be received with cyclic redundancy check scrambled by the group-radio network temporary identifier, and informs a user equipment that the physical downlink control channel order is associated with a particular service being received by the user equipment. According to other example embodiments, the method may also include performing blind decoding using an appropriate downlink control information format according to a configuration for blind decoding in searching for the physical downlink control channel order. According to some example embodiments, the physical downlink control channel order may include a modified group common physical downlink control channel or downlink control information.

In some example embodiments, the transmitted signal may be a random-access preamble. In some example embodiments, the transmitted signal may be a random-access preamble that is transmitted using power ramping, and power ramping may be terminated by reception of a random-access response. In other example embodiments, uplink transmission of the signal may be performed while the apparatus is in an INACTIVE mode or an IDLE mode.

Figure 2:
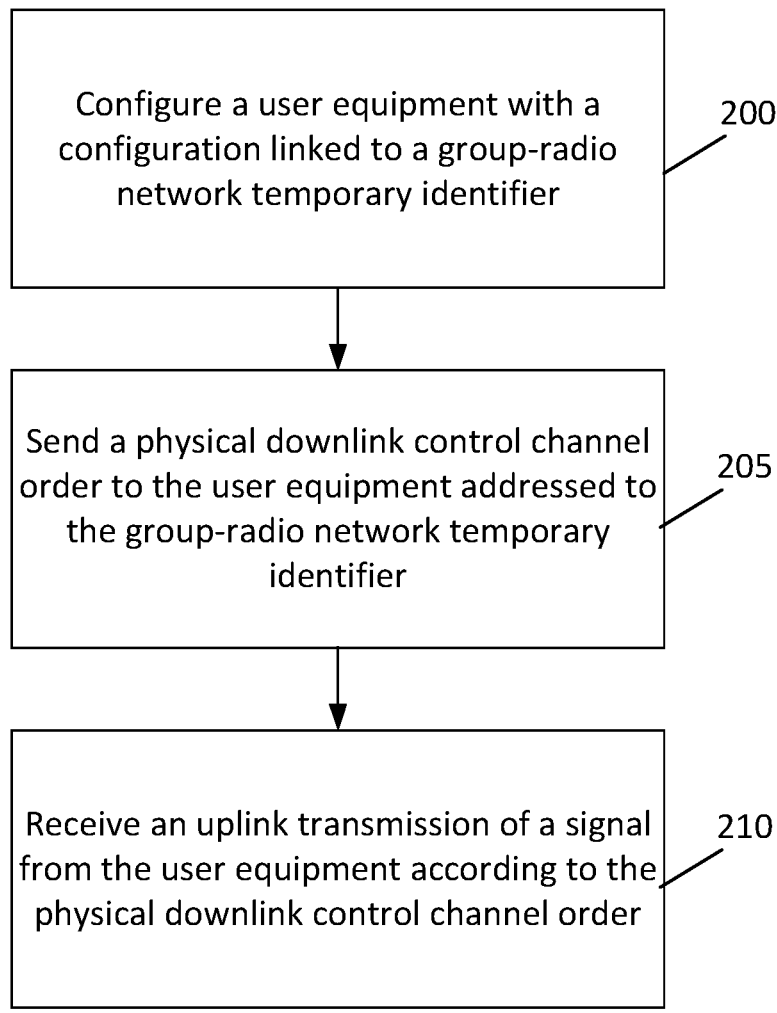
FIG. 2 illustrates an example flow diagram of another method, according to certain example embodiments.

FIG. 2 illustrates an example flow diagram of another method, according to certain example embodiments. In an example embodiment, the method of FIG. 2 may be performed by a network entity, network node, or a group of multiple network elements in a 3GPP system, such as LTE or 5G-NR. For instance, in an example embodiment, the method of FIG. 2 may be performed by a gNB, for instance similar to apparatus 20 illustrated in FIG. 5(*b*).

According to certain example embodiments, the method of FIG. 2 may include, at 200, configuring a user equipment with a configuration linked to a group-radio network temporary identifier. At 205, the method may include sending a physical downlink control channel order to the user equipment addressed to the group-radio network temporary identifier. At 210, the method may include receiving an uplink transmission of a signal from the user equipment according to the physical downlink control channel order.

According to certain example embodiments, the method may also include determining which user equipment is receiving a multicast service or a broadcast service based on the received uplink transmission of the signal. According to some example embodiments, the method may also include maintaining or disabling the multicast service or the broadcast service based on the received uplink transmission of the signal. According to other example embodiments, the method may further include sending a response to the user equipment to terminate a power ramping process when power ramping is configured for the transmission of the signal.

In certain example embodiments, the method may also dynamically requesting signal transmissions from the user equipment at predefined intervals include. In other example embodiments, the method may further include off-loading the user equipment to use different uplink resources, and requesting the user equipment via physical downlink control channel signaling to adjust an amount of power used to transmit the uplink transmission.

Figure 3:
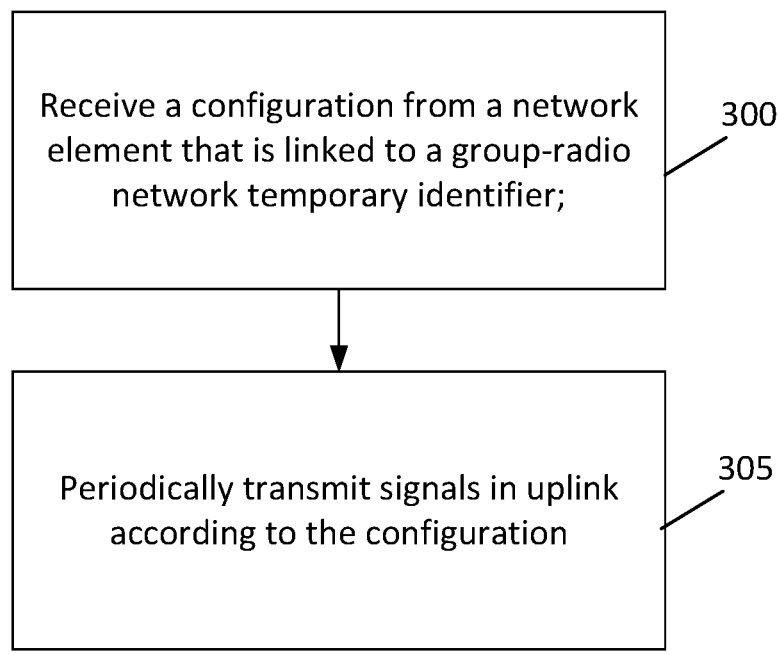
FIG. 3 illustrates an example flow diagram of yet another method, according to certain example embodiments.

FIG. 3 illustrates an example flow diagram of a further method, according to certain example embodiments. In an example embodiment, the method of FIG. 3 may be performed by a network entity, network node, or a group of multiple network elements in a 3GPP system, such as LTE or 5G-NR. For instance, in an example embodiment, the method of FIG. 3 may be performed by a UE, for instance similar to apparatus 10 illustrated in FIG. 5(*a*).

According to certain example embodiments, the method of FIG. 3 may include, at 300, receiving a configuration from a network element that is linked to a group-radio network temporary identifier. At 305, the method may include periodically transmitting signals in uplink according to the configuration.

According to certain example embodiments, the signals may be random-access preambles. According to further example embodiments, the configuration may be linked to a particular service being received by the apparatus. According to some example embodiments, the method may further include receiving a periodicity of resources for the signals. According to other example embodiments, the periodicity of the resources provisioned for the signals may be shorter than an interval that the apparatus is requested to transmit the signals.

Figure 4:
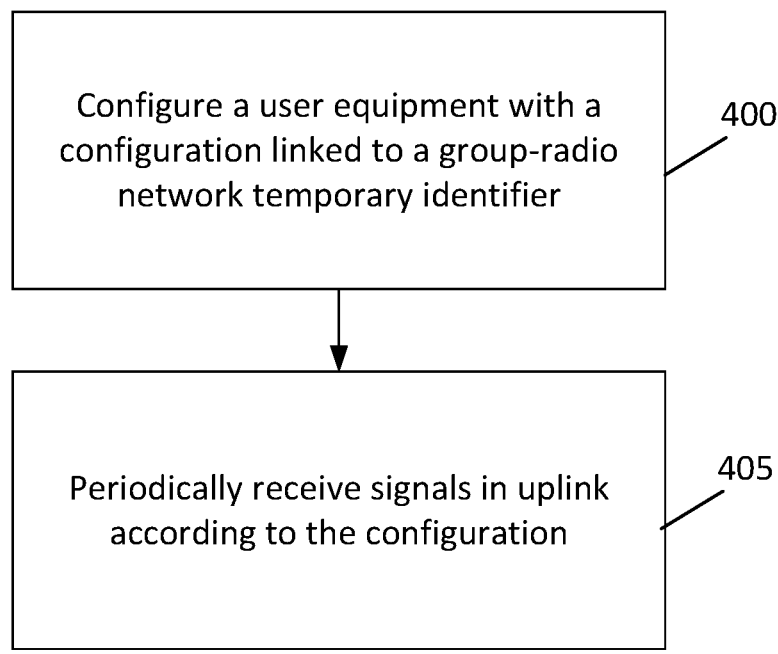
FIG. 4 illustrates an example flow diagram of a further method, according to certain example embodiments.

FIG. 4 illustrates an example flow diagram of yet another method, according to certain example embodiments. In an example embodiment, the method of FIG. 4 may be performed by a network entity, network node, or a group of multiple network elements in a 3GPP system, such as LTE or 5G-NR. For instance, in an example embodiment, the method of FIG. 4 may be performed by a gNB, for instance similar to apparatus 20 illustrated in FIG. 5(*b*).

According to certain example embodiments, the method of FIG. 4 may include, at 400, configuring a user equipment with a configuration linked to a group-radio network temporary identifier. At 405, the method may include periodically receiving signals in uplink according to the configuration.

According to certain example embodiments, the configuration may be linked to a particular service being received by the user equipment. According to other example embodiments, the method may also include provisioning a periodicity of resources for the signals. According to some example embodiments, the method may further include requesting the user equipment to transmit the signals at a predefined interval. In some example embodiments, the periodicity of the resources provisioned for the signals may be shorter than the interval that the user equipment is requested to transmit the signals.

FIG. 5(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 5(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 5(*a*).

As illustrated in the example of FIG. 5(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5(*a*), multiple processors may be utilized according to other example embodiments. For example, it should be understood that in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1 and 3.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1 and 3.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive a physical downlink control channel order addressed to a group-radio network temporary identifier. The apparatus 10 may also be controlled by memory 14 and processor 12 to perform uplink transmission of a signal in response to the physical downlink control channel order.

In other example embodiments, apparatus 10 may be controlled by memory 14 and processor 12 to receive a configuration from a network element that is linked to a group-radio network temporary identifier. Apparatus 10 may also be controlled by memory 14 and processor 12 to periodically transmit signals in uplink according to the configuration.

Figure 5B:
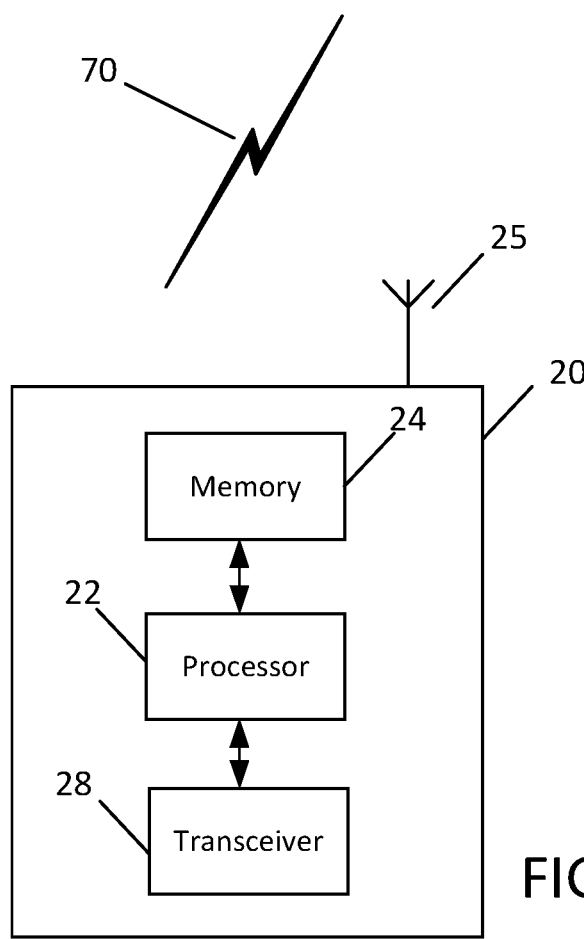
FIG. 5(b) illustrates another apparatus, according to certain example embodiments.

FIG. 5(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, and/or WLAN access point, associated with a radio access network (RAN), such as an LTE network, 5G or NR. It should be noted that one of ordinary skill in the art would understand that apparatus 20 may include components or features not shown in FIG. 5(b).

As illustrated in the example of FIG. 5(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5(b), multiple processors may be utilized according to other example embodiments. For example, it should be understood that in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 2 and 4.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 2 and 4.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to configure a user equipment with a configuration linked to a group-radio network temporary identifier. Apparatus 20 may also be controlled by memory 24 and processor 22 to send a physical downlink control channel order to the user equipment addressed to the group-radio network temporary identifier. Apparatus 20 may further be controlled by memory 24 and processor 22 to receive an uplink transmission of a signal from the user equipment according to the physical downlink control channel order.

In further example embodiments, apparatus 20 may be controlled by memory 24 and processor 22 to configure a user equipment with a configuration linked to a group-radio network temporary identifier. Apparatus 20 may also be controlled by memory 24 and processor 22 to periodically receive signals in uplink according to the configuration.

Certain example embodiments may be directed to an apparatus that includes means for receiving a physical downlink control channel order addressed to a group-radio network temporary identifier. The apparatus may also include means for performing uplink transmission of a signal in response to the physical downlink control channel order.

Further example embodiments may be directed to an apparatus that includes means for receiving a configuration from a network element that is linked to a group-radio network temporary identifier. The apparatus may also include means for periodically transmitting signals in uplink according to the configuration.

Other example embodiments may be directed to an apparatus that includes means for configuring a user equipment with a configuration linked to a group-radio network temporary identifier. The apparatus may also include means for sending a physical downlink control channel order to the user equipment addressed to the group-radio network temporary identifier. The apparatus may further include means for receiving an uplink transmission of a signal from the user equipment according to the physical downlink control channel order.

Additional example embodiments may be directed to an apparatus that includes means for configuring a user equipment with a configuration linked to a group-radio network temporary identifier. The apparatus may also include means for periodically receiving signals in uplink according to the configuration.

Certain example embodiments described herein provide several technical improvements, enhancements, and/or advantages. In some example embodiments, it may be possible to know if and roughly how many INACTIVE UEs are receiving a multicast service, if and roughly how many INACTIVE UEs are receiving a broadcast service, and if and roughly how many IDLE UEs are receiving a broadcast service. According to other example embodiments, it may be possible for the UE to optimize UL power and/or retransmissions. In certain example embodiments, it may be possible for the network to provide new UEs with frequency opportunities to declare their interest for the sake of service, while keep-alive transmission activity of incumbent UEs is limited. In further example embodiments, it may be possible to enable the network to decide to either maintain or disable a broadcast/multicast service. In other example embodiments, it may be possible for the UE to monitor/blind decode for an appropriate DCI format containing the PDCCH order in an appropriate MBS service CORESET. Furthermore, the RRC configurations may be made as part of the common or UE-specific search space configurations.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
BS Base Station
CORESET Control Resource Set
CRC Cyclic Redundancy Check
CSI Channel State Information
DCI Downlink Control Information
DL Downlink
eNB Enhanced Node B
GC Group Common
gNB 5G or Next Generation NodeB
G-RNTI Group-RNTI
HARQ Hybrid Automatic Repeat Request
LTE Long Term Evolution
MBMS Multimedia Broadcast Multicast Service
NR New Radio
PDCCH Physical Downlink Control Channel
PDCP Packet Data Convergence Protocol
PDSCH Physical Downlink Shared Channel
PUCCH Physical Uplink Control Channel
RAN Radio Access Network
RNA RAN-based Notification Area
RRC Radio Resource Control
RNTI Radio Network Temporary Identifier
UE User Equipment

We claim:

1. An apparatus, comprising:
at least one processor; and
at least one memory comprising computer program code,
the at least one memory and the computer program code are configured, with the at least one processor, to cause the apparatus at least to
receive a physical downlink control channel order addressed to a group-radio network temporary identifier configured for at least one multicast broadcast service, wherein the physical downlink control channel order informs the apparatus that the physical downlink control channel order is associated with a count of inactive and idle user equipment and determination that the apparatus is receiving a particular multicast broadcast service; and
perform uplink transmission of a signal in response to the physical downlink control channel order.

2. The apparatus according to claim 1,
wherein the physical downlink control channel order is received with cyclic redundancy check scrambled by the group-radio network temporary identifier, and
wherein the at least one memory and the computer program code are further configured, with the at least one processor, to cause the apparatus at least to perform blind decoding using an appropriate downlink control information format according to a configuration for blind decoding in searching for the physical downlink control channel order.

3. The apparatus according to claim 1, wherein the physical downlink control channel order comprises a modified group common physical downlink control channel or downlink control information.

4. The apparatus according to claim 1,
wherein the transmitted signal is a random-access preamble.

5. The apparatus according to claim 1,
wherein the transmitted signal is a random-access preamble that is transmitted using power ramping, and
wherein power ramping is terminated by reception of a random-access response.

6. The apparatus according to claim 1, wherein uplink transmission of the signal is performed while the apparatus is in an INACTIVE mode or an IDLE mode.

7. An apparatus, comprising:
at least one processor; and
at least one memory comprising computer program code, the at least one memory and the computer program code are configured, with the at least one processor, to cause the apparatus at least to
configure a user equipment with a configuration linked to a group-radio network temporary identifier configured for at least one multicast broadcast service;
send a physical downlink control channel order to the user equipment addressed to the group-radio network temporary identifier; and
receive an uplink transmission of a signal from the user equipment according to the physical downlink control channel order, wherein the at least one memory and the computer program code are further configured, with the at least one processor, to cause the apparatus at least to:
count inactive and idle user equipment and determine which user equipment is receiving a particular multicast service or a broadcast service based on the received uplink transmission of the signal.

8. The apparatus according to claim 7, wherein the at least one memory and the computer program code are further configured, with the at least one processor, to cause the apparatus at least to:
maintain or disable the multicast service or the broadcast service based on the received uplink transmission of the signal.

9. The apparatus according to claim 7, wherein the at least one memory and the computer program code are further configured, with the at least one processor, to cause the apparatus at least to:
send a response to the user equipment to terminate a power ramping process when power ramping is configured for the transmission of the signal.

10. The apparatus according to claim 7, wherein the at least one memory and the computer program code are further configured, with the at least one processor, to cause the apparatus at least to:
dynamically request signal transmissions from the user equipment at predefined intervals.

11. The apparatus according to claim 7, wherein the at least one memory and the computer program code are further configured, with the at least one processor, to cause the apparatus at least to:
off-load the user equipment to use different uplink resources; or
request the user equipment via physical downlink control channel signaling to adjust an amount of power used to transmit the uplink transmission.

12. An apparatus, comprising:
at least one processor; and
at least one memory comprising computer program code, the at least one memory and the computer program code are configured, with the at least one processor, to cause the apparatus at least to
receive a configuration from a network element that is linked to a group-radio network temporary identifier configured for at least one multicast broadcast service associated with multicast broadcast services, wherein the configuration is associated with a count of inactive and idle user equipment and determination that the apparatus is receiving a particular multicast broadcast service; and
periodically transmit signals in uplink according to the configuration.

13. The apparatus according to claim 12, wherein the signals are random-access preambles.

14. The apparatus according to claim 12, wherein the at least one memory and the computer program code are further configured, with the at least one processor, to cause the apparatus at least to:
receive a periodicity of resources for the signals,
wherein the periodicity of the resources provisioned for the signals is shorter than an interval that the apparatus is requested to transmit the signals.

15. An apparatus, comprising:
at least one processor; and
at least one memory comprising computer program code, the at least one memory and the computer program code are configured, with the at least one processor, to cause the apparatus at least to
configure a user equipment with a configuration linked to a group-radio network temporary identifier configured for at least one multicast broadcast service associated with multicast broadcast services, wherein the configuration is associated with a count of inactive and idle user equipment and determination that the user equipment is receiving a particular multicast broadcast service; and
periodically receive signals in uplink according to the configuration.

16. The apparatus according to claim 15, wherein the at least one memory and the computer program code are further configured, with the at least one processor, to cause the apparatus at least to:
provision a periodicity of resources for the signals; and
request the user equipment to transmit the signals at a predefined interval,
wherein the periodicity of the resources provisioned for the signals is shorter than the interval that the user equipment is requested to transmit the signals.

* * * * *